US006364488B1

United States Patent
Lin

(12) United States Patent
(10) Patent No.: US 6,364,488 B1
(45) Date of Patent: Apr. 2, 2002

(54) PROJECTION DISPLAY DEVICE FOR DISPLAYING ELECTRICALLY ENCODED IMAGES

(75) Inventor: Shang-Yi Lin, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 09/688,227

(22) Filed: Oct. 16, 2000

(30) Foreign Application Priority Data

Jun. 23, 2000 (TW) .......................................... 89112374

(51) Int. Cl.[7] .................. G03B 21/14; G03B 21/00; G03B 21/26; G03B 21/28; G03F 1/1335
(52) U.S. Cl. ........................ 353/31; 353/20; 353/33; 353/34; 353/37; 349/8
(58) Field of Search ............................ 353/20, 31, 33, 353/34, 37; 349/8, 9

(56) References Cited

U.S. PATENT DOCUMENTS

| | | | | |
|---|---|---|---|---|
| 6,089,719 A | * | 7/2000 | Lin | 353/33 |
| 6,183,091 B1 | * | 2/2001 | Johnson et al. | 353/20 |
| 6,247,814 B1 | * | 6/2001 | Lin | 353/20 |
| 6,247,815 B1 | * | 6/2001 | Cipolla et al. | 353/31 |
| 6,309,071 B1 | * | 10/2001 | Huang et al. | 353/31 |

* cited by examiner

Primary Examiner—Russell Adams
Assistant Examiner—Magda Cruz
(74) Attorney, Agent, or Firm—Winston Hsu

(57) ABSTRACT

A projection display device for displaying electrically encoded images includes an L-type optical module, which includes first, second, and third polarization beam splitter mirrors and a first retarder film. The first and the third polarization beam splitter mirrors are aligned in a plane that is perpendicular to the second polarization beam splitter mirror. A first monochromatic polarized beam is directed to the first polarization beam splitter mirror, and a bi-chromatic polarized beam is directed to the third polarization splitter mirror. The first polarization beam splitter mirror directs the first monochromatic polarized beam to a first modulation unit, and a first modulated beam reflects from the first modulation unit to the second polarization beam splitter mirror via the first retarder film. The third polarization beam splitter mirror splits the bi-chromatic polarized beam into a second monochromatic polarized beam and a third monochromatic polarized beam according to the polarizations of the beams, and directs these beams to the second and the third modulation units, respectively. The second and the third modulated beams from the second and the third modulation units are directed to the second polarization beam splitter mirror via the first retarder film and are combined with the first modulated beam to form an output beam.

22 Claims, 5 Drawing Sheets

PROJECTION DISPLAY DEVICE FOR DISPLAYING ELECTRICALLY ENCODED IMAGES

BACKGROUND OF THE INVENTION

1. Field of the Invention

The present invention provides a projection display device, and more particularly, a projection display device for displaying electrically encoded images.

2. Description of the Prior Art

Please refer to FIG. 1. FIG. 1 is a schematic diagram of a prior art projection display device 10. A light source 12 supplies light to a uniform illumination optical device 14 set in front of the light source 12 to convert light from light source 12 into a beam that has an even radiance and that is almost square. A dichroic device 16 splits the beam into three beams of different color (red, green, and blue). An approximately square trichromatic prism 18 having three input surfaces 18a and an output surface 18b combines the three different input beams to form an output beam. Three light modulation devices 20, made from liquid crystal panels, are set in front of the three input surfaces 18a of the trichromatic prism 18. The light modulation devices 20 are electrically controlled and modulate the input beams to produce modulated output beams having an image. Three focus lenses 17, 19 and 21 are set in front of the three light modulation devices 20 to focus the input beams from the dichroic device 16 onto the three light modulation devices 20. A projection lens is disposed in front of the output surface 18b of the trichromatic prism 18 to project the output light from the trichromatic prism 18 to a screen 24. The light modulation devices 20 are formed from transparent, monochromatic liquid crystal displays to display monochromatic images. The trichromatic prism 18 combines the three monochromatic images from three monochromatic liquid crystal displays into a chromatic image and outputs the chromatic image via the output surface 18b.

A first dichroic mirror 26 within the trichromatic device 16 splits a monochromatic beam from the optical device 14. A reflector 27 reflects the monochromatic beam from the dichroic mirror 26 to the focus lens 17. A second dichroic mirror 28 splits the other two color beams out of the beam from the dichroic mirror 26. In this manner, the beam from the uniform illumination optical device 14 is first split into a red input beam by the first dichroic mirror 26, and delivered to the focus lens 17. The light is then split into a blue input beam by the second dichroic mirror 28 and directed to the focus lens 19, with the remaining green input beam directed to the focus lens 21. The green input beam passes through two lenses 30 and two reflectors 32 on its way to the focus lens 21.

It is clear from FIG. 1 that the red, blue, and green beams do not travel the same distance in the dichroic device 16. The red and the blue beams travel about the same distance, both of which pass through one dichroic lens and one reflector. But the traveling distance of the green input beam is longer than that of the red and the blue input beams, which affects the illumination of the green input beam. To compensate for the loss of illumination in the green input beam, the two lenses 30 are placed in front of the two reflectors 32 to focus the green input beam. Although this configuration balances the green input beam with the two other beams, it makes the projection display device 10 more complicated and increases overall manufacturing costs.

SUMMARY OF THE INVENTION

It is therefore a primary objective of the present invention to provide a projection display device that uses an L-type optical module to resolve differences in the traveling distances of the three color input beams, and to simplify the configuration of the prior art projection display device.

Briefly, this invention provides a projection display device to display electrically encoded images, and includes an L-type optical module to control the route of the beams. This optical module includes first, second, and third polarization beam splitter mirrors, and a first retarder film. The first and the third beam splitters are in the same plane, which is perpendicular to the second beam splitter. The first retarder film is located between the second and the third beam splitters. When a monochromatic polarized beam and a bi-chromatic polarized beam are input into the optical module, the monochromatic polarized beam will be directed to the first polarization beam splitter mirror and the bi-chromatic polarized beam will be directed to the third polarization beam splitter mirror. The first polarization beam splitter mirror directs the monochromatic polarized beam to the first modulation unit and the first modulation beam from the first modulation unit to the second polarization beam splitter mirror. The third polarization beam splitter mirror splits the bi-chromatic polarized beam into two monochromatic polarized beams according to their polarities, directing them to the second or the third modulation unit, and directs the second and the third modulation beams reflected from the second and the third modulation units to the second polarization beam splitter mirror via the first retarder film. The second polarization beam splitter mirror combines the first, the second, and the third modulation beams to form an output beam.

It is an advantage of the present invention that the traveling distances of three different colors of polarized beams are almost the same because of the arrangement of the optical module.

This, and other objectives of the present invention, will no doubt become obvious to those of ordinary skill in the art after reading the following detailed description of the preferred embodiment, which is illustrated in the various figures and drawings.

DETAILED DESCRIPTION OF THE PREFERRED EMBODIMENT

Figure 1:
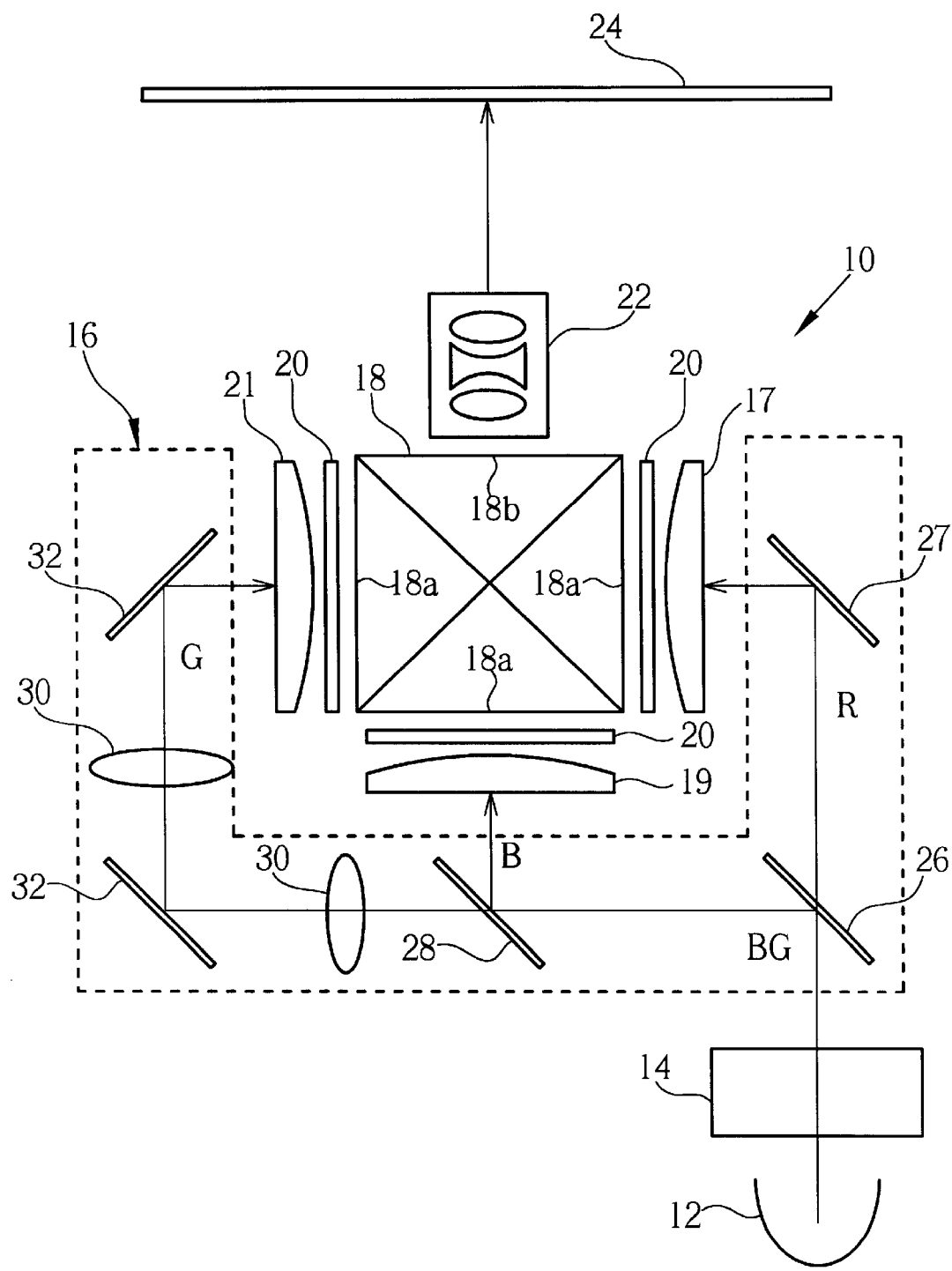
FIG. 1 is a schematic diagram of a prior art projection display device for a liquid crystal display projector.
Figure 2:
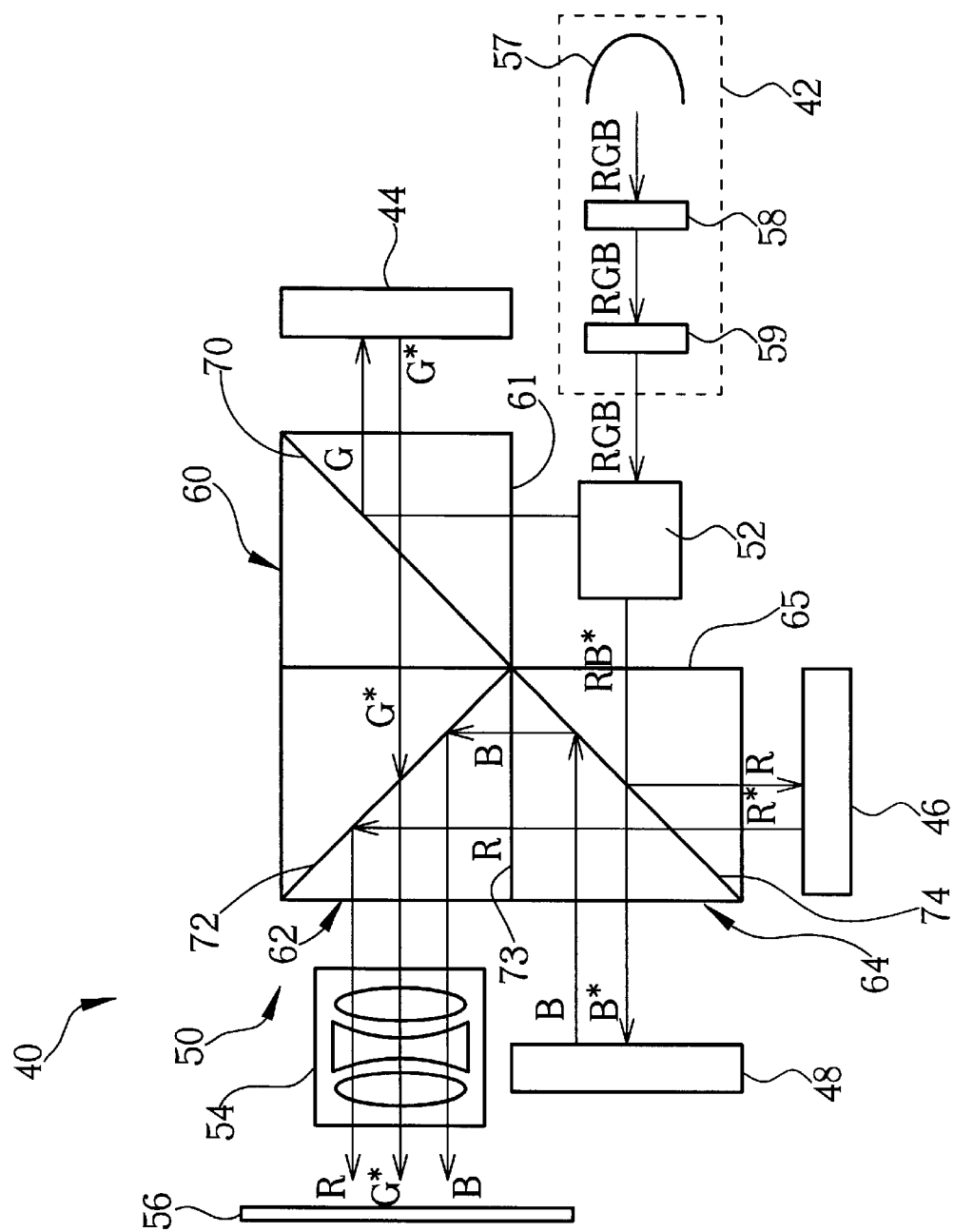
FIG. 2 is a schematic diagram of the present invention projection display device for a liquid crystal display projector.

Please refer to FIG. 2. FIG. 2 is a schematic diagram of a present invention projection display device 40 for a liquid crystal display projector. The projection display device 40 includes a light source 42 to produce three colors (red, green, and blue) of polarized beams having the same polarization; first, second, and third modulation units 44, 46 and 48 that each modulate a monochromatic polarized beam by reflection and change the polarization of the beam; an L-type optical module 50 to control the route of each polarized beam; an input lens series 52 between the light source 42 and the interior corner of the L-type optical module 50; and a projection lens 54 to project the output beams from the L-type optical module 50 onto a screen 56.

The light source 42 includes a tube 57 to produce three colors (red, blue, and green) of non-polarized light, a polarization converter 58 to convert the light into polarized light, and a uniform illumination optical device 59 to smooth and equalize the radiance of the polarized light.

Figure 3:
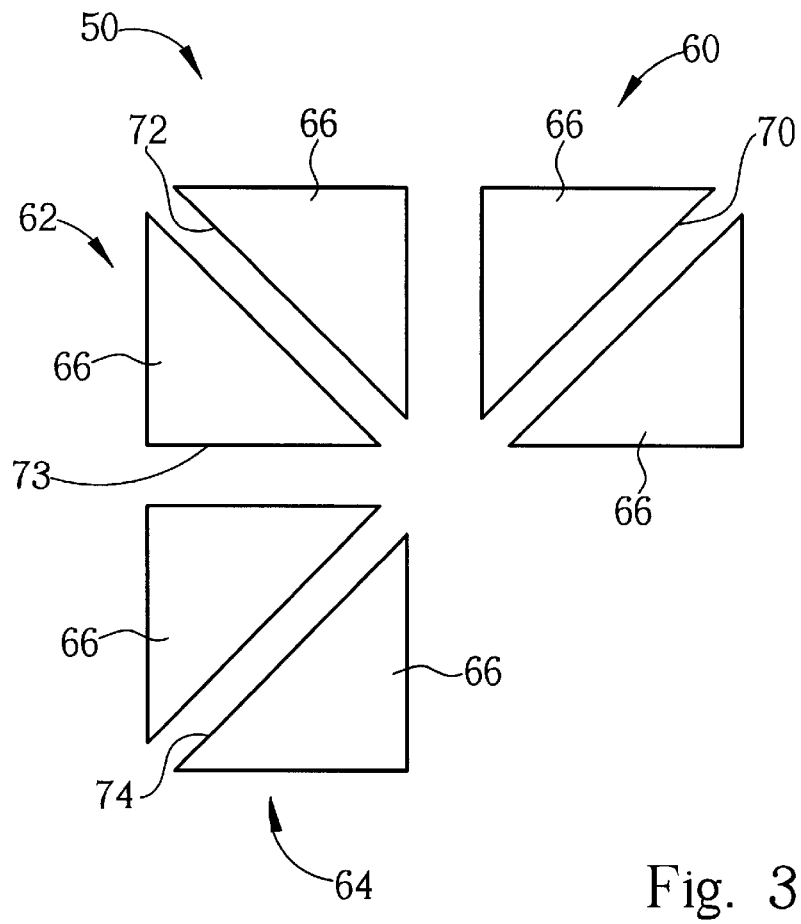
FIG. 3 is a schematic diagram of an L-type optical module of FIG. 2.

Please refer to FIG. 3. FIG. 3 is a schematic diagram of the L-type optical module 50. The L-type optical module 50 includes three approximately identical transparent square blocks, which are a first, a second, and a third block 60, 62 and 64, respectively. The blocks 60, 62 and 64 are formed from a plurality of transparent triangular blocks 66. The second block 62 is located between the first and the third blocks 60 and 64. The first, the second, and the third polarization beam splitter mirrors 70, 72 and 74 are set diagonally inside the first, the second, and the third blocks 60, 62 and 64. The first retarder film 73 is located between the second and the third polarization beam splitter mirrors 72 and 74. The first and the third polarization beam splitter mirrors 70 and 74 are aligned in the same plane, which is perpendicular to the second polarization beam splitter mirror 72. The first, second, and third polarization beam splitter mirrors 70, 72, and 74 are each sandwiched between two transparent triangular blocks 66. The first retarder film 73 is located between the second and the third blocks 62 and 64. The inner side of the L-type optical module 50, formed by the perpendicular sides of the first and the third blocks 60 and 64, is a concave right-angle input for the input light beams.

Figure 4:
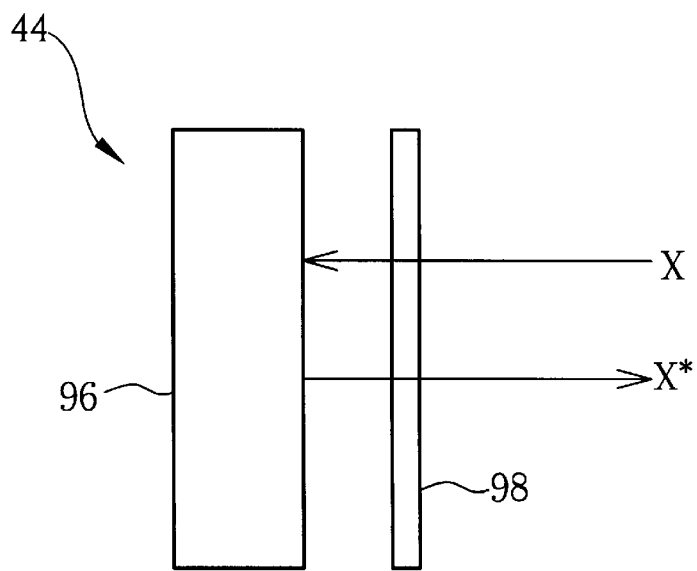
FIG. 4 is a schematic diagram of a first modulation unit of FIG. 2.

Please refer to FIG. 4. FIG. 4 is a schematic diagram of the first modulation unit 44. Each modulation unit 44, 46, and 48 includes a reflecting image modulation device 96 to modulate the input beams by reflection to form modulated beams, and a quarter-wave retarder 98 to retard the beams by a quarter of their wavelengths so that the polarization of the input beam is opposite to that of the output reflected beam. The reflecting image modulation device 96 can be a digital micro-mirror device or a liquid crystal display.

Figure 5:
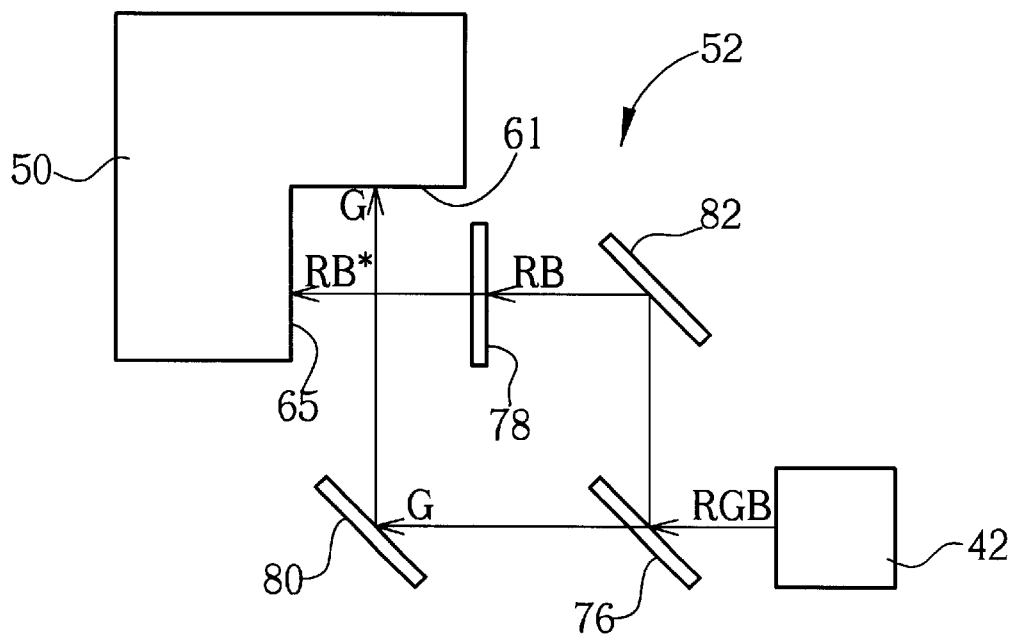
FIG. 5 is a schematic diagram of an input lens series of FIG. 2.

Please refer to FIG. 5. FIG. 5 is a schematic diagram of the input lens series 52. The input lens series 52 is installed between the light source 42 and the L-type optical module 50. The input lens series 52 includes a dichroic mirror 76 to split the tri-chromatic polarized light from the light source 42 into a monochromatic polarized beam and a bi-chromatic polarized beam. A second retarder film 78 changes the polarization of a monochromatic polarized beam within the bi-chromatic polarized beam. Two reflectors 80 and 82 perpendicularly deliver the monochromatic polarized beam and the bi-chromatic polarized beam into two corresponding perpendicular surfaces 61 and 65 of the inner region of the L-type optical module 50.

As shown in FIG. 2, when the monochromatic polarized beam and the bi-chromatic polarized beam are input into the two perpendicular sides 61 and 65 of the inner region of the L-type optical module 50, the monochromatic polarized beam is directed to the first polarization beam splitter mirror 70 located diagonally inside the first block 60, and the bi-chromatic polarized beam is directed to the third polarization beam splitter mirror 74 located diagonally inside the third block 64.

The first dichroic mirror 70 directs the monochromatic polarized beam to the first modulation unit 44 by reflection. The modulated beam reflected from the first modulation unit 44 and having an opposite polarization passes through the first polarization splitter beam mirror 70 on to the second polarization beam splitter mirror 72, which is located diagonally inside the second block 62. Alternatively, the first modulation unit 44 can be located outside the other triangular block 66 of the first cylinder 60. In this case, the monochromatic polarized beam will initially pass through the first polarization beam splitter mirror 70 to the first modulation unit 44, and the modulated reflected beam, having an opposite polarization, will then be reflected by the first polarization beam splitter mirror 70 to the second polarization beam splitter mirror 72.

The third polarization beam splitter mirror 74 splits the bi-chromatic polarized beam into two monochromatic (red and blue) polarized beams according to their polarizations. These red and blue polarized beams are sent to the second and the third modulation unit 46 and 48 by reflecting off of or passing through the third polarization beam splitter mirror 74, respectively. The red modulated beam reflects from the second modulation unit 46 with an opposite polarization, passes through the third polarization beam splitter mirror 74 and the first retarder film 73, which reverses its polarization, and goes on to the second polarization beam splitter mirror 72. The blue modulated beam reflects from the third modulation unit 48 with an opposite polarization, and is reflected by the third polarization beam splitter mirror 74 to the second polarization beam splitter mirror 72. Although the modulated blue beam passes through the first retarder film 73, the first retarder film 73 is designed to change only the polarization of the red beam, and so the polarization of the modulated blue beam remains unchanged.

Of course, it is fully possible to change the positions of the second and third modulation units 46 and 48. In such a case, the functioning of the third polarization beam splitter mirror 74 would be changed to ensure that that the red beam initially passes through the third polarization beam splitter mirror 74, and the blue beam reflects from the third polarization beam splitter mirror 74.

Figure 6:
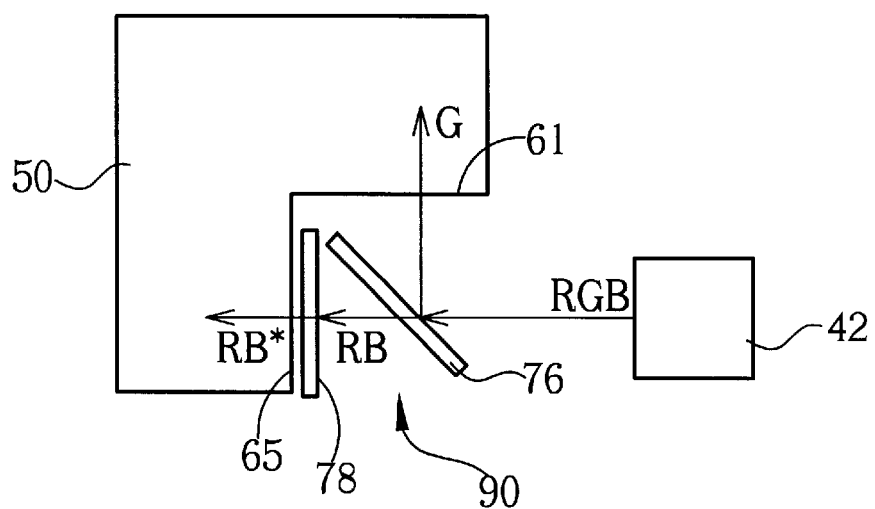
FIG. 6 is a schematic diagram of another present invention input lens series.

Please refer to FIG. 6. FIG. 6 is a schematic diagram of another input lens series 90 of the present invention. A fourth dichroic mirror 76 of the input lens series 90 is located diagonally within the concavity of the two perpendicular sides 61 and 65 of the L-type optical module 50. The second retarder 78 is attached to one perpendicular face 65 inside the L-type optical module 50 to change the polarization of the blue polarized beam.

Figure 7:
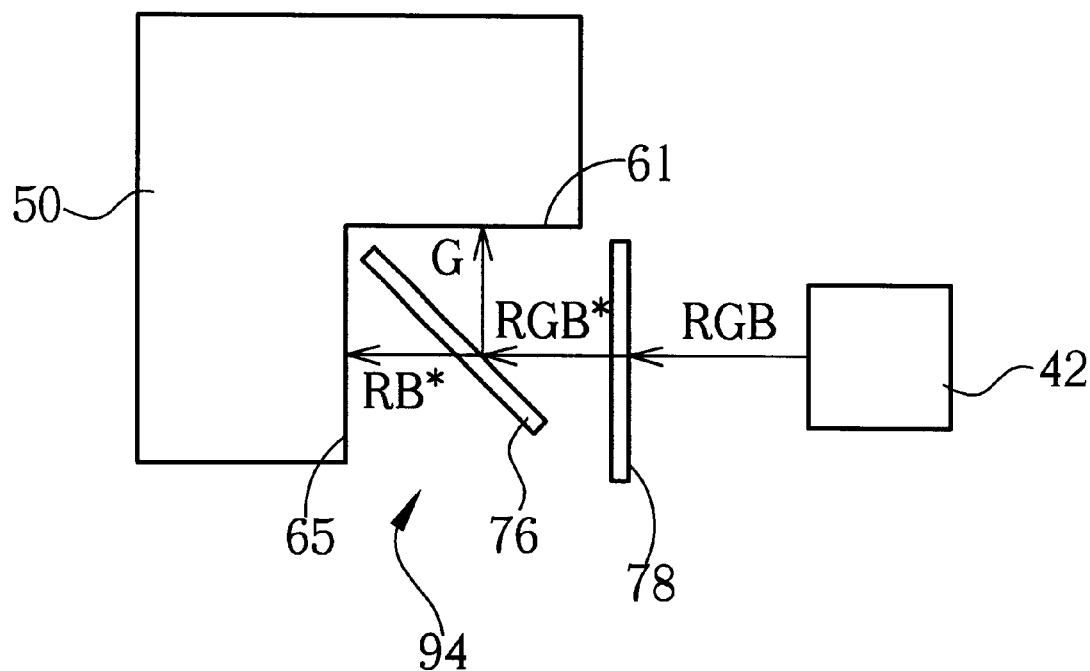
FIG. 7 is a schematic diagram of another present invention input lens series.

Please refer to FIG. 7. FIG. 7 is a schematic diagram of another input lens series 94 of the present invention. The dichroic mirror 76 of the input lens series 94 is located diagonally within the concavity of the L-type optical module 50, and the second retarder film 78 is disposed between the dichroic mirror 76 and the light source 42. The second retarder film 78 changes the polarization of the blue polarized beam in the tri-chromatic (blue, green, and red) polarized input light to an opposite polarization. The dichroic mirror 76 then splits the tri-chromatic polarized light into a green polarized beam and a bi-chromatic (blue and red) polarized beam. The polarization of the blue polarized beam is opposite to that of the red polarized beam.

Finally, the green modulated beam passes through the second polarization beam splitter mirror 70 to the projection lens 54. The red and the blue modulated beams from the third polarization beam splitter mirror 74 reflects off of the second polarization beam splitter mirror 70 to the projection lens 54. Of course, if the projection lens set 54 is disposed on the other face of the block 62, then the second polarization beam splitter mirror 70 would be changed so that the red and the blue modulated beams pass through the second polarization beam splitter mirror 70. Similarly, the green modulated beam would reflect off of the second polarization beam splitter mirror 70.

Although the first retarder film 73 only changes the polarization of the red modulated beam and does not alter that of the blue modulated beam, it is, of course, possible to design the first retarder film 73 so that it changes the polarization of the blue modulated beam and not that of the red modulated beam. Setting a third retarder film between the first and the second polarization beam splitter mirrors 70 and 72 to change the polarization of the green modulated beam would make the polarization of the green modulated beam and that of bi-chromatic (red and blue) modulated beams opposite. The three modulated beams would then reflect off of or pass through the second polarization beam splitter mirror 72 to form an output beam, which is then projected onto the screen 56.

It is clear from the configuration of the projection display device 40 that the traveling distances in the projection display device 40 of three color beams are almost the same and are all very short. Hence, there is no need to use other redundant lenses and reflectors to split the input beam or to compensate for lost radiance due to different traveling distances. Additionally, because the elements of the input lens series are adjustably located inside the projection display device 40, users can easily adjust the elements inside the projection display device 50 to fine tune the routes of the input beams. In comparison with the prior art projection display device 10, the configuration of the present invention is not only simpler, but is also cheaper and more efficient.

Those skilled in the art will readily observe that numerous modifications and altercations of the device may be made while retaining the teachings of the invention. Accordingly, the above disclosure should be construed as limited only by the metes and bounds of the appended claims.

What is claimed is:

1. A projection display device comprising:

a light source for producing tri-chromatic polarized light having red, green, and blue polarized beams, each beam having a same polarization;

first, second, and third modulation units, each modulation unit using reflection to modulate one of the polarized beams and to change the polarization of the polarized beam;

an optical module comprising:
        first, second, and third polarization beam splitter mirrors, the first and the third polarization beam splitter mirrors aligned in a plane that is perpendicular to the second polarization beam splitter mirror; and
        a first retarder film located between the second and the third polarization beam splitter mirrors; and an input lens series located between the light source and the optical module, the input lens series comprising a dichroic mirror for splitting the tri-chromatic polarized light into a first monochromatic polarized beam and a bi-chromatic polarized beam comprising a second monochromatic polarized beam and a third monochromatic polarized beam, and a second retarder film for changing the polarization of the second monochromatic polarized beam in the bi-chromatic polarized beam, the first monochromatic polarized beam and the bi-chromatic polarized beam exiting from the input lens series along two perpendicular directions;

wherein the first monochromatic polarized beam is directed to the first polarization beam splitter mirror, the bi-chromatic polarized beam is directed to the third polarization splitter mirror, the first polarization beam splitter mirror directing the first monochromatic polarized beam to the first modulation unit and a first modulated beam reflecting from the first modulation unit to the second polarization beam splitter mirror, the third polarization beam splitter mirror splitting the bi-chromatic polarized beam into the second monochromatic polarized beam and the third monochromatic polarized beam according to the polarizations of the second and the third monochromatic polarized beams and directing the second and the third monochromatic polarized beams to the second and the third modulation units, respectively, a second and a third modulated beams respectively reflecting from the second and the third modulation units to the second polarization beam splitter mirror via the first retarder film, the first retarder film changing the polarization of the second or third modulated beam, the second polarization beam splitter mirror combining the first, the second, and the third modulated beams to form an output beam.

2. The projection display device of claim 1 wherein the optical module is an L-type optical module further comprising three approximately identical transparent square blocks, which are a first, a second, and a third block, the second block disposed between the first and the third block, each of the three polarization beam splitter mirrors diagonally disposed inside one of the corresponding transparent square blocks, perpendicular faces on the first and the third transparent square blocks forming a right-angled concavity in the L-type optical module.

3. The projection display device of claim 2 wherein the first retarder film is located between the second and the third transparent square blocks.

4. The projection display device of claim 2 wherein the three approximately identical transparent square blocks are each formed by a plurality of transparent triangular blocks, and the first, the second, and the third polarization beam splitter mirrors are each disposed diagonally between two triangular blocks.

5. The projection display device of claim 2 wherein the second polarization beam splitter mirror of the input lens series changes the polarization of the first monochromatic polarized beam, and the dichroic mirror splits the tri-chromatic polarized light into a first monochromatic polarized beam and a bi-chromatic polarized beam, the bi-chromatic polarized beam comprising a second monochromatic polarized beam and a third monochromatic polarized beam, the polarization of the second monochromatic polarized beam and the third monochromatic polarized beam being different.

6. The projection display device of claim 5 wherein the dichroic mirror is located diagonally between two perpendicular faces of the L-type optical module, and the second retarder film is located between the dichroic mirror and the light source.

7. The projection display device of claim 1 further comprising a projection lens to project the output beam from the second polarization beam splitter mirror onto a screen.

8. The projection display device of claim 1 wherein the light source comprises a tube for producing three colors (red, green, and blue) of non-polarized light, and a polarization converter for polarizing the light.

9. The projection display device of claim 1 wherein the light source comprises a uniform illumination optical device for equalizing the radiance distribution of the light within the tri-chromatic polarized light.

10. The projection display device of claim 1 wherein the dichroic mirror of the input lens series splits the tri-chromatic polarized light from the light source into a first monochromatic polarized beam and a bi-chromatic polarized beam, the bi-chromatic polarized beam comprising a second monochromatic polarized beam and a third monochromatic polarized beam, and the second retarder film changes the polarization of the second monochromatic polarized beam of the bi-chromatic polarized beam.

11. The projection display device of claim 10 wherein the input lens series further comprises two reflectors to direct the first monochromatic polarized beam and the bi-chromatic polarized beam into two perpendicular directions to the two perpendicular faces of the L-type optical module.

12. The projection display device of claim 10 wherein the dichroic mirror is located diagonally between two perpendicular faces of the L-type optical module, and the second polarization beam splitter mirror is disposed on one of the perpendicular faces of the L-type optical module to change the polarization of the second monochromatic polarized beam of the bi-chromatic polarized beam.

13. The projection display device of claim 12 wherein the input lens series further comprises a polarization film attached to the other perpendicular face of the L-type optical module to purify the first monochromatic polarized beam.

14. The projection display device of claim 1 wherein the first polarization beam splitter mirror reflects the first monochromatic polarized beam to the first modulation unit, and the first modulated beam reflects from the first modulation unit to the second polarization beam splitter mirror via the first polarization beam splitter mirror.

15. The projection display device of claim 1 wherein the first monochromatic polarized beam passes through the first polarization beam splitter mirror to the first modulation unit, and the first modulated beam is reflected from the first modulation unit and is reflected by the first polarization beam splitter mirror to the second polarization splitter mirror.

16. The projection display device of claim 1 wherein the second monochromatic polarized beam of the bi-chromatic polarized beam reflects from the third polarization beam splitter mirror to the second modulation unit, the third monochromatic polarized beam of the bi-chromatic polarized beam passes through the third polarization beam splitter mirror to the third modulation unit, the second modulated beam reflects from the second modulation unit and passes through the third polarization beam splitter mirror to the second polarization beam splitter mirror via the first retarder film, and the third modulated beam reflects from the third modulation unit and is directed to the second polarization beam splitter mirror via the first retarder film by reflecting off of the third polarization beam splitter mirror.

17. The projection display device of claim 1 wherein each modulation unit comprises a reflecting image modulator to modulate an input beam and generate a modulated output beam, and a quarter-wave retarder to retard the input beam and the output beam by a quarter of their wave lengths so that the polarization of the input beam is opposite to the polarization of the output beam.

18. The projection display device of claim 17 wherein the reflecting image modulator is a digital micro-mirror device.

19. The projection display device of claim 17 wherein the reflecting image modulator is a liquid crystal display.

20. The projection display device of claim 1 wherein the second polarization beam splitter mirror reflects the first modulated beam into a predetermined direction, and the second and the third modulated beams pass through the second polarization beam splitter mirror into the predetermined direction so that the modulated beams are combined to form the output beam.

21. The projection display device of claim 1 wherein the first modulated beam passes through the second polarization beam splitter into a predetermined direction, and the second and the third modulated beams are reflected into the predetermined direction by the second polarization beam splitter so that the modulated beams are combined to form the output beam.

22. The projection display device of claim 1 wherein the optical module further comprises a third retarder film between the first and the second polarization beam splitter mirrors to change the polarization of the first modulated beam.

* * * * *